July 28, 1925.

Re. 16,129

S. HEATH

VARIABLE PITCH PROPELLER

Original Filed July 2, 1919 2 Sheets-Sheet 1

Inventor

Spencer Heath

By Watson, Coit, Morse & Grindle

Attorney

July 28, 1925.

Re. 16,129

S. HEATH

VARIABLE PITCH PROPELLER

Original Filed July 2, 1919 2 Sheets-Sheet 2

Inventor

Spencer Heath,

By Watson, Cole, Moser & Grindle

Attorney

170. MOTORS, ELECTRIC CURRENT.
CANCELED

Reissued July 28, 1925. Re. 16,129

UNITED STATES PATENT OFFICE.

SPENCER HEATH, OF BALTIMORE, MARYLAND.

VARIABLE-PITCH PROPELLER.

Original No. 1,446,795, dated February 27, 1923, Serial No. 308,112, filed July 2, 1919. Application for reissue filed April 28, 1925. Serial No. 26,523.

*To all whom it may concern:*

Be it known that I, SPENCER HEATH, a citizen of the United States, residing at Baltimore, State of Maryland, have invented certain new and useful Improvements in Variable-Pitch Propellers, of which the following is a specification.

This invention relates to propellers, and more particularly to aerial propellers.

In certain classes of air work, it is extremely desirable to be able to vary the pitch or angle of the blades while the propeller is running, to compensate for different conditions of engine speed or atmospheric density. In other classes of work, such as in the control of dirigibles, and in checking the speed of air planes when landing on a comparatively restricted surface, as, for example, the deck of a ship, it becomes important to completely reverse the propeller blades, so as to change the direction of thrust.

While it has heretofore been proposed to construct propellers so that the pitch of the blades can be adjusted, the adjustment has, in most cases, been limited to a comparatively small angle. In prior devices, too, the adjusting mechanism has included parts constantly in frictional engagement, and the high speed of the propeller has proven so destructive to the contact surfaces as to render such arrangements impractical.

The objects of the present invention, therefore, are to provide a propeller construction in which the blades can be completely adjusted or turned through 360° in either direction, and in which all parts between which there is relative movement are normally out of contact being brought into engagement only momentarily, at the time the adjustment takes place. To this end I have devised an improved arrangement of gearing by means of which rotation of the engine shaft in the same direction serves to turn the blade adjusting mechanism in either direction, at will, such gearing including a reversing device, and also a worm and worm wheel, which latter serves to lock or hold the blades in adjusted position, and absolutely prevent accidental displacement thereof.

In order that my invention may be readily understood, reference is had to the accompanying drawings, forming part of this specification, and in which:—

Figures 1, 2:
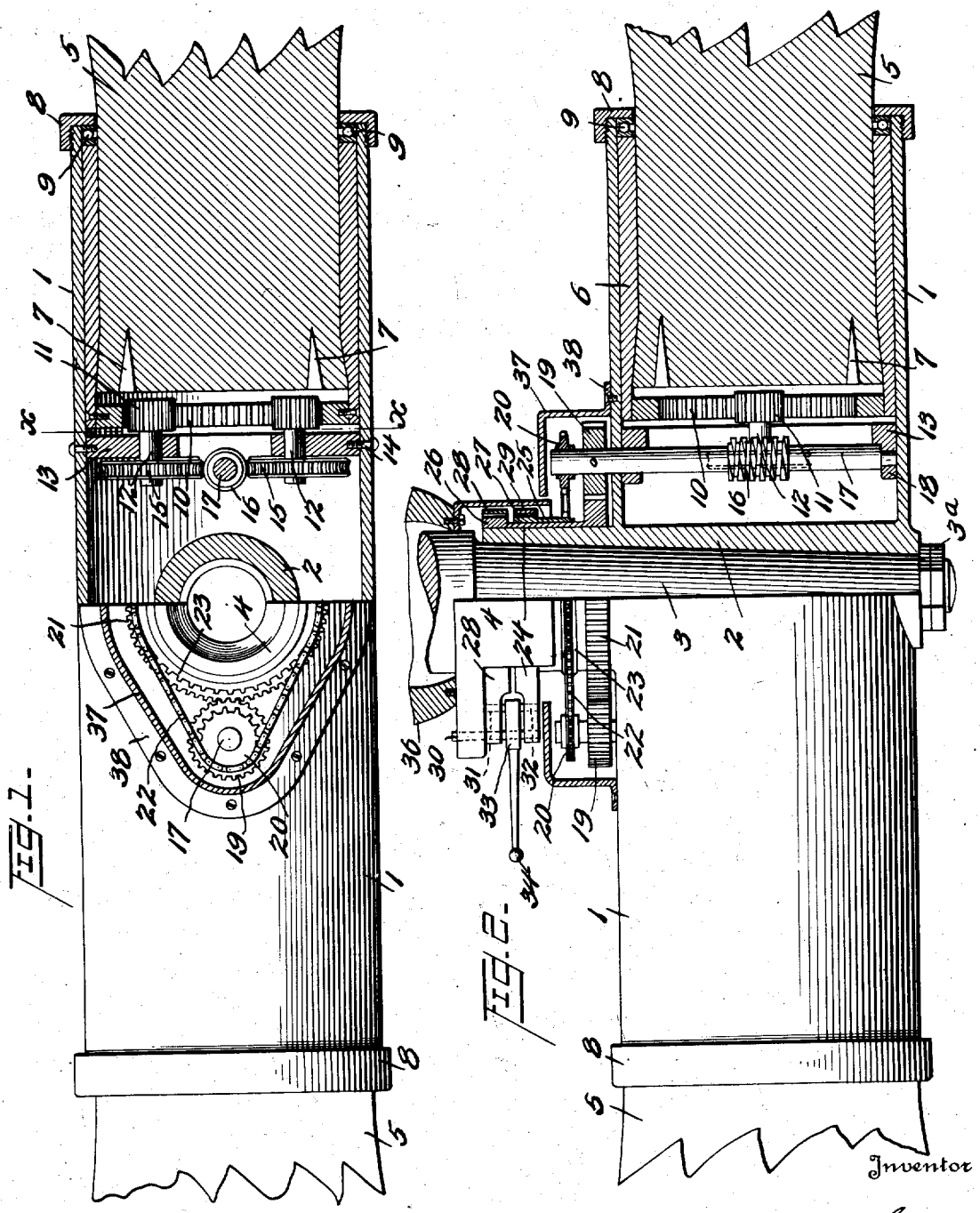
Figure 1 is an end elevation, partly in section, of my improved propeller hub and associated parts.
Figure 2 is a view of the same, half in horizontal section and half in plan.
Figure 3:
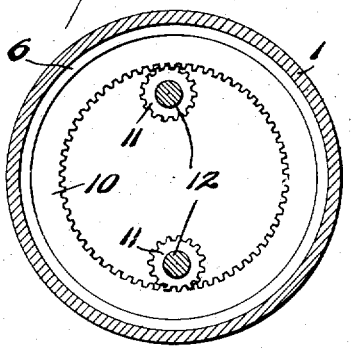
Figures 3 and 4 are sections on the line X—X of Figure 1 looking respectively to the right and the left.

Referring to the drawings in detail, my improved propeller comprises a hub 1, shown as cylindrical, and provided at its ends with a pair of tubular sockets adapted to receive the ends of the propeller blades, two such blades being shown. The hub is provided at its center with a transversely extending tapered socket 2 adapted to receive the main engine shaft 3, to which the hub is secured by means of a nut $3^a$. The socket member 2 is extended rearwardly as indicated at 4 in Fig. 2 for a purpose which will hereafter appear.

Each propeller blade 5 is received in a cylindrical ferrule 6, in which it is secured by means of wedges 7, the internal diameter of the ferrule being somewhat enlarged at its inner end for this purpose. The ferrules 6 are capable of rotation within the tubular sockets formed by the hub 1 and are held therein by means of anti-friction thrust bearings 9 interposed between the outer ends of the ferrules and retaining rings 8, which are screw-threaded to the ends of the hub.

In order to angularly adjust or rotate the ferrules and blades upon their own axes, I secure an annular internal gear 10 in the inner end of each ferrule. Meshing with this annular gear are a pair of diametrically opposed pinions 11 secured to stub shafts 12, journaled in a fixed annular frame or ring 13, secured within the hub 1 as by means of screws 14.

Figure 4:
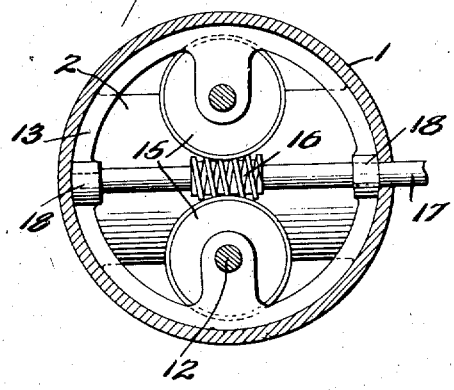

Secured to the inner ends of the stub shafts 12 are a pair of worm wheels 15 having oppositely inclined teeth. Interposed between these worm wheels and meshing therewith is a worm 16, having crossed threads, as clearly shown in Figs. 2 and 4. One of the threads is adapted to engage with one of the worm wheels and the other thread is adapted to engage the other worm wheel, the threads being of opposite pitch, so that when the worm revolves, the worm wheels will be driven in such a direction as to cause the pinions 11 to turn the annular gear 10 in the same direction. It will be observed that this double thread is necessary, since as will be obvious, a worm with a single thread would drive the pinions 11 in such a direction that they would tend to turn the annular gear 10 in opposite directions, thus resulting in an inoperative arrangement. By the use of my novel double threaded worm, the pinions are caused to rotate in the proper directions.

The worm 16 is secured to a supplementary shaft 17 extending transversely through the hub and journaled in bosses 18 carried by the ring 13. The rear ends of the shafts 17 project beyond the hub, and to the projecting end of each shaft are secured a pinion 19 and a sprocket wheel 20. Mounted between the pinions 19 and in mesh therewith is a gear 21, loosely journaled on the extension 4 of the shaft socket 2. Rigidly connected with the gear 21 is a sleeve 24 carrying at its end a brake drum 26.

While I have shown the sleeve 24 as carried by and journaled on the hub extension 4, it will be understood that this sleeve may be mounted upon the shaft 3 itself or other member rigid with the hub sockets 1 and rotatable therewith about the same axis. The essential thing is that the sleeve 24 is wholly supported by such member and normally rotates with it, so that there is no constant running friction between any movable parts of the blade adjusting mechanism, and any fixed parts or elements.

Freely journaled upon the sleeve 24 is a sprocket wheel 23 rigidly connected with a sleeve 25, carrying at its end a brake drum 27. A sprocket chain 22 passes around the two sprockets 20 and the sprocket wheel 23, thus gearing them positively together.

From the foregoing it will be evident that rotation of the gear 21 and the concentric sprocket wheel 23 in the same direction will turn the shafts 17 in opposite directions. In other words, the gear 21 and its associated pinions 19, and the sprocket wheels 20 and 23 with their chain 22, constitute reverse gearing by means of which the shafts 17 may be rotated in either direction, through the rotation of the engine shaft in one direction.

Co-operating with the brake drums 26 and 27 which rotate with the propeller, are relatively fixed brake bands 28 and 29. These two bands have one end fixed, as, for example, by being secured to a pivot pin 30, set into an enclosing housing 35. The other ends 31 and 32 of the brake bands 28 and 29, respectively, are secured to pins projecting from the opposite sides of a Y-shaped lever 33, mounted on the pivot pin 30 and provided with an operating handle 34. The housing 35 which carries the pivot pin 30 is suitably supported on a part 36 of the engine frame. The reversing gear above described is also enclosed within a case or housing 37, having a flange 38 shaped to fit the hub 1, and secured thereto.

Figure 5:
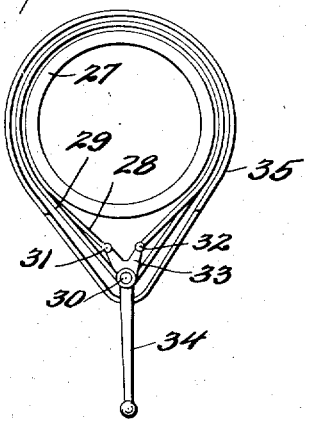
Figures 5 and 6 are elevations showing my improved band brake mechanism in inoperative and operative positions, respectively.
Figure 6:
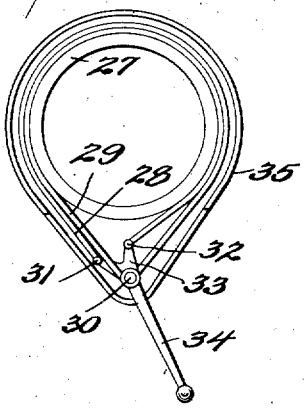

Normally, with the lever 34 in the central or neutral position, as shown in Fig. 5 both brake bands 28 and 29 are out of contact with their respective drums, and are separated therefrom by a suitable clearance. When the propeller is running, therefore, there are no parts in frictional contact, and hence no excessive wear. When it is desired to angularly adjust or turn the propeller blades on their axes, the lever 34 is thrown to one side or the other, as indicated in Fig. 6, thus tightening one or the other of the brake bands and causing it to engage its respective drum. Since the engine shaft and propeller are rotating, it will be evident that as soon as the friction between a brake band and its drum is sufficient to retard the free movement of the drum, the drum will be caused to slow up relative to the propeller, with the result that either the gear 21 or the sprocket wheel 23 is caused to rotate relative to the propeller hub, thus driving the shafts 17 in one direction or the other according to the direction in which the lever 34 was thrown. In other words, this lever selectively brings into operation either one drum or the other, according to which way it was thrown, and thus drives the supplementary shafts 17 through either the gearing or the sprocket wheels, thereby producing angular displacement of the propeller blades in one direction or the other, as desired. The supplementary shafts 17, it will be noted, are arranged eccentrically of and parallel with the main shaft 3, that is they are not co-axial therewith. It will also be noted that the mechanism for adjusting the blades is arranged entirely externally of the main shaft 3.

It will be particularly observed that with my improved construction there is no limit to the amount of rotation which may be imparted to the propeller blades, the extent of turning being simply dependent upon the length of time that the brake band is held in engagement with its drum. Owing to the reduction gearing between the drums and blades, such gearing including the worm 16, a number of revolutions of the shafts 17 is necessary in order to produce a comparatively small displacement of the blades. Furthermore, it will be observed that by the simple expedient of using the worm and

CANCELED worm wheels, I secure a positive lock, for effectively holding the blades in adjusted position and preventing accidental displacement. By employing two worm wheels and two pinions arranged on opposite sides of the axes of rotation, I produce a balanced couple and thus avoid danger of cramping or binding, such as might result from the application of power to one point only of the annular gear 10.

Having thus described my invention, what is claimed as new and desired to be secured by Letters Patent is:

1. A propeller having angularly adjustable blades, a shaft for rotating said propeller, means for adjusting said blades while the propeller is in motion, said means comprising two sleeves, one surrounding the other and both surrounding said shaft and normally rotating therewith, said sleeves being rotatable relative to each other and relative to said shaft, means for retarding rotation of either of said sleeves at will, and gear mechanism operated by retardation of either of said sleeves for adjusting said blades.

2. A propeller having a hub, a main shaft to which said hub is rigidly secured, an adjustable blade carried by said hub, two sleeves surrounding said main shaft and normally rotating therewith, one of said sleeves surrounding the other, said sleeves being rotatable relative to each other and to said main shaft, a supplementary shaft arranged eccentrically of said main shaft and operatively connected to said blade, means for retarding rotation of either of said sleeves at will, and gear mechanism operated by retardation of either of said sleeves for rotating said supplementary shaft to adjust said blade.

3. A propeller having a hub, a main shaft to which said hub is rigidly secured, an adjustable blade carried by said hub, two sleeves surrounding said main shaft and normally rotating therewith, said sleeves being rotatable relative to each other and to said main shaft, a supplementary shaft arranged eccentrically of said main shaft and transversely of the axis of said blade and operatively connected to said blade, means for retarding rotation of either of said sleeves at will, and gear mechanism operated by retardation of either of said sleeves for rotating said supplementary shaft to adjust said blade.

4. A propeller having a hub, a main shaft to which said hub is rigidly secured, an adjustable blade carried by said hub, two sleeves surrounding said main shaft and normally rotating therewith, one of said sleeves surrounding the other, said sleeves being rotatable relative to each other and to said main shaft, a supplementary shaft arranged eccentrically of said main shaft and transversely of the axis of said blade and operatively connected to said blade, means for retarding rotation of either of said sleeves at will, and gear mechanism operated by retardation of either of said sleeves for rotating said supplementary shaft to adjust said blade.

5. A propeller having a hub, a main shaft to which said hub is rigidly secured, an adjustable blade carried by said hub, two sleeves surrounding said main shaft and normally rotating therewith, said sleeves being rotatable relative to each other and to said main shaft, a supplementary shaft arranged eccentrically of and parallel with said main shaft and extending transversely through said hub, means for retarding rotation of either of said sleeves at will, and gear mechanism operated by retardation of either of said sleeves for rotating said supplementary shaft to adjust said blade.

6. A propeller having a hub, a main shaft to which said hub is rigidly secured, a plurality of adjustable blades carried by said hub, two sleeves surrounding said shaft adjacent said hub, and normally rotating therewith, said sleeves being rotatable relative to each other and to said main shaft, a plurality of supplementary shafts arranged eccentrically of and parallel with said main shaft and extending transversely through said hub, there being a supplementary shaft for each of said blades, each of said supplementary shafts being operatively connected to its corresponding blade, means for retarding rotation of either of said sleeves at will, and gear mechanism operated by retardation of either of said sleeves for rotating said supplementary shafts to adjust said blades.

7. A propeller having a hub, a main shaft to which said hub is rigidly secured, an adjustable blade carried by said hub, two sleeves surrounding said main shaft and normally rotating therewith, one of said sleeves surrounding the other, said sleeves being rotatable relative to each other and to said main shaft, a supplementary shaft arranged eccentrically of and parallel with said main shaft and extending transversely through said hub, means for retarding rotation of either of said sleeves at will, and gear mechanism operated by retardation of either of said sleeves for rotating said supplementary shaft to adjust said blades.

8. A propeller having a hub, a main shaft to which said hub is rigidly secured, a plurality of adjustable blades carried by said hub, two sleeves surrounding said shaft adjacent said hub, one of said sleeves surrounding the other, said sleeves being rotatable relative to each other and to said main shaft, each of said sleeves having a gear wheel rigidly secured thereto on the end thereof adjacent said hub and each having a brake drum on its opposite end, gear mechanism operatively connecting said gear wheels to said blades, whereby retarding rotation of either of said sleeves will cause adjustment of said blades, and means cooperating with said brake drums for retarding rotation of either of said sleeves at will.

9. A propeller having a hub, a main shaft to which said hub is rigidly secured, a plurality of adjustable blades carried by said hub, two sleeves surrounding said shaft adjacent said hub, one of said sleeves surrounding the other, said sleeves being rotatable relative to each other and to said main shaft, each of said sleeves having a gear wheel rigidly secured thereto on the end thereof adjacent said hub and each having a brake drum on its opposite end, a plurality of supplementary shafts mounted in said hub, one for each blade, one end of each of said supplementary shafts projecting outside of said hub, gear wheels on said projecting ends of the supplementary shafts for cooperating with said first named gear wheels, and means cooperating with said brake drums for retarding rotation of either of said sleeves, whereby rotation of said supplementary shafts and adjustment of the blades is effected.

10. The combination with a propeller having a hub provided with sockets, of blades having shanks angularly adjustable in said sockets, a main shaft extending transversely through said hub and secured thereto, gear mechanism arranged in said sockets between the inner ends of said shanks and said main shaft and operatively connected to said shanks, two sleeves surrounding said main shaft adjacent said hub and normally rotating with said shaft, said sleeves being rotatable relative to each other and relative to said shaft, means for causing relative rotation of said sleeves and means connecting said sleeves to said gear mechanism, whereby relative rotation of said sleeves will cause operation of said gear mechanism and adjustment of said blades.

11. The combination with a hub having a socket, of a propeller blade rotatably mounted in said socket, a main shaft to which said hub is secured, a supplementary shaft carried by said hub eccentrically of said main shaft and extending into said hub transversely of the axis of said blade, gearing inside of said hub associated with said supplementary shaft and said blade for rotating the latter when said supplementary shaft is rotated, and power operated mechanism associated with said supplementary shaft for rotating the same in either direction at will while the propeller is running.

12. In combination with an engine frame, a main shaft projecting therefrom, a propeller hub secured to said main shaft, a plurality of adjustable blades carried by said hub, a plurality of supplementary shafts carried by said hub, one for each blade, each of said shafts extending outside of said hub toward said engine frame, means inside of said hub for rotating each of said blades when said supplementary shafts are rotated, and means arranged between said engine frame and said hub for rotating said supplementary shafts at will, said means comprising two sleeves surrounding said main shaft and normally rotating therewith, said sleeves being rotatable relative to each other and to said main shaft, and means for retarding rotation of one of said sleeves relative to the other, whereby rotation of said supplementary shafts results.

13. The combination with a hub, of a propeller blade rotatably mounted therein, a main shaft to which said hub is secured, two sleeves surrounding said shaft adjacent said hub and normally rotating therewith, one of said sleeves having a gear wheel thereon, a supplementary shaft carried by said hub eccentrically of said main shaft and extending at an angle to the axis of said blade and operatively connected therewith, a gear on said supplementary shaft for cooperating with the gear wheel on said sleeve, gear mechanism arranged between the other one of said sleeves and said supplementary shaft, and means for retarding rotation of either of said sleeves whereby rotation of said supplementary shaft and blade is effected.

14. The combination with a hub, of a plurality of propeller blades rotatably mounted therein, a main shaft to which said hub is secured, two sleeves surrounding said shaft adjacent said hub and normally rotating with said shaft, one of said sleeves having a gear wheel thereon, a plurality of supplementary shafts carried by said hub, one being operatively connected to each blade, said supplementary shafts being arranged eccentrically of and parallel with said main shaft, a gear on each of said supplementary shafts for cooperating with the gear wheel on said sleeve, gear mechanism arranged between the other of said sleeves and each of said supplementary shafts, and means for retarding rotation of either of said sleeves at will, whereby rotation of said supplementary shafts and blades is effected.

15. A propeller having a hub, a plurality of angularly adjustable blades mounted therein, a main shaft for rotating said propeller hub, a plurality of supplementary shafts journalled in said hub, one for each blade, said supplementary shafts being arranged parallel to and eccentrically of the axes of said main shaft and extending into said hub, means arranged entirely externally of said main shaft for simultaneously rotating said supplementary shafts to adjust said blades, said means comprising two sleeves normally rotating during rotation

CANCELED

Draftsman of said main shaft, and mechanism for retarding rotation of either of said sleeves at will.

16. A propeller having angularly adjustable blades, and means for adjusting them, said means comprising reversing gearing including a chain and sprocket wheels, and a uni-directional rotary source of power for operating said reversing gearing.

17. A propeller having angularly adjustable blades, means associated with each blade for angularly adjusting the same, a pair of brake drums normally rotating with the propeller, and operatively connected through reverse gearing with said adjusting means, a pair of brakes adapted to engage said rotating drums to actuate the adjusting means in either direction, and a single lever for selectively shifting said brakes.

18. The combination with a hub, of a propeller blade mounted therein for rotation on its own axis, and gearing for so rotating said blade, said gearing including a pair of worms having right and left threads mounted on the same axis, and a pair of oppositely disposed worm wheels meshing with said worms.

19. The combination with a hub, of a propeller blade mounted therein for rotation on its own axis, and gearing for rotating said blade, said gearing including a worm having crossed threads, and a pair of oppositely disposed worm wheels meshing therewith.

20. The combination with a hub, of a propeller blade mounted therein for rotation on its own axis, and gearing for rotating said blade, said gearing comprising an internal annular gear secured to said blade, a pinion meshing therewith, a worm wheel rigid with said pinion, and a worm engaging said worm wheel.

21. The combination with a hub, of a propeller blade mounted therein for rotation on its own axis, and gearing for rotating said blade, said gearing comprising an internal annular gear secured to said blade, a pair of pinions meshing therewith, a worm wheel rigid with each pinion, and a worm having crossed threads disposed between and meshing with said worm wheels.

22. The combination with a hub, of a propeller blade mounted therein for rotation on its own axis, and gearing for rotating said blade, said gearing comprising an annular gear, a pair of pinions meshing therewith, a pair of worm wheels respectively secured to said pinions, and a worm having crossed threads disposed between said wheels and meshing therewith, one of said wheels engaging one thread, and one the other thread.

In testimony whereof I hereunto affix my signature.

SPENCER HEATH.